US009875077B2

(12) United States Patent
Markovitz et al.

(10) Patent No.: US 9,875,077 B2
(45) Date of Patent: Jan. 23, 2018

(54) PERSONALIZED CAR RADIO SYSTEM

(71) Applicants: Haim Nachum Markovitz, Ramat Gan (IL); Alon Markovitz, Givatayim (IL)

(72) Inventors: Haim Nachum Markovitz, Ramat Gan (IL); Alon Markovitz, Givatayim (IL)

(*) Notice: Subject to any disclaimer, the term of this patent is extended or adjusted under 35 U.S.C. 154(b) by 0 days.

(21) Appl. No.: 15/232,816

(22) Filed: Aug. 10, 2016

(65) Prior Publication Data

US 2016/0350065 A1    Dec. 1, 2016

Related U.S. Application Data

(63) Continuation of application No. 14/406,533, filed as application No. PCT/IL2013/050482 on Jun. 4, 2013, now abandoned.

(30) Foreign Application Priority Data

Jun. 14, 2012    (IL) .......................................... 220411

(51) Int. Cl.

| | |
|---|---|
| *G10L 13/00* | (2006.01) |
| *G06F 3/16* | (2006.01) |
| *G06F 17/30* | (2006.01) |
| *G10L 25/48* | (2013.01) |
| *H04N 21/258* | (2011.01) |
| *H04N 21/2668* | (2011.01) |
| *G10L 17/22* | (2013.01) |
| *H04W 64/00* | (2009.01) |

(52) U.S. Cl.
CPC .............. *G06F 3/162* (2013.01); *G06F 3/165* (2013.01); *G06F 17/30743* (2013.01); *G06F 17/30749* (2013.01); *G06F 17/30761* (2013.01); *G06F 17/30769* (2013.01); *G06F 17/30778* (2013.01); *G06F 17/30864* (2013.01); *G10L 13/00* (2013.01); *G10L 17/22* (2013.01); *G10L 25/48* (2013.01); *H04N 21/25891* (2013.01); *H04N 21/2668* (2013.01); *H04W 64/006* (2013.01)

(58) Field of Classification Search
CPC ......... G10L 13/00; G06F 17/00; G06F 17/21; H04N 21/00; H04N 21/254
USPC .......................................... 704/260; 709/219
See application file for complete search history.

(56) References Cited

U.S. PATENT DOCUMENTS 5,819,259 A * 10/1998 Duke-Moran .... G06F 17/30707
9,230,018 B2 * 1/2016 Hohl ................. G06F 17/30749
(Continued)

*Primary Examiner* — Daniel Abebe
(74) *Attorney, Agent, or Firm* — Edward Langer

(57) ABSTRACT

A personalized car radio system comprising: a remote application server comprising: a collector, being a software that scans web sites continuously, for detecting content that corresponds to keywords expressing a driver's preferences; a client application, being a software that schedules displaying collected content in accordance with an alertness rank of the driver and a rhythm of the content; and a client device interacting with the application server by Unicast communication, the client device comprising: a safety module, being a software activated continuously or intermittently, for determining an alertness rank according to (a) metered movement of an organ of the driver, and (b) road condition; and a sounding device and a user interface thereof, for sounding the scheduled content; and a text-to-speech converter, being executed either on the server or the client device, for converting text files to audio files.

20 Claims, 9 Drawing Sheets

(56) References Cited

U.S. PATENT DOCUMENTS

| | | | |
|---|---|---|---|
| 2003/0132953 A1 | 7/2003 | Johnson et al. | |
| 2009/0030978 A1 | 1/2009 | Johnson et al. | |
| 2009/0292719 A1* | 11/2009 | Lachtarnik | G06F 17/27 |
| 2010/0064053 A1* | 3/2010 | Bull | H04N 21/254 |
| | | | 709/231 |
| 2010/0186049 A1 | 7/2010 | Carhart et al. | |
| 2012/0306637 A1* | 12/2012 | McGough | B60K 37/06 |
| | | | 340/439 |
| 2013/0041893 A1* | 2/2013 | Strike | G06F 17/3089 |
| | | | 707/723 |
| 2013/0214939 A1* | 8/2013 | Washlow | G01S 7/003 |
| | | | 340/901 |
| 2015/0160019 A1* | 6/2015 | Biswal | G01C 21/26 |
| | | | 701/1 |
| 2015/0255055 A1* | 9/2015 | Panguluri | G10L 13/00 |
| | | | 704/260 |
| 2015/0255056 A1* | 9/2015 | Panguluri | G10L 13/00 |
| | | | 704/260 |
| 2016/0332569 A1* | 11/2016 | Ishida | B60W 50/14 |

* cited by examiner

PERSONALIZED CAR RADIO SYSTEM

CROSS-REFERENCE TO RELATED APPLICATIONS

This application is a continuation-in-part of U.S. application Ser. No. 14/406,533, filed Dec. 9, 2014, which was the National Stage of International Application No. PCT/IL2013/050482, filed on Jun. 4, 2013, which claims the benefit of priority of Israel Patent Application No. 220411, filed on Jun. 14, 2012, and which are incorporated herein by reference in their entirety.

FIELD OF THE INVENTION

The present invention relates to the field of information presentation. More particularly, the invention relates to a system for personal presentation of audio information which improves a user's safety while driving a car.

BACKGROUND OF THE INVENTION

Radio receivers, media players or other multimedia presentation devices are informational tools used for utilizing time when the ear resource is available, and other human resources are busy. For example, while driving, the eyes of the user must be fully attentive to the environment, the hands and the legs busy controlling the car, but the ears are essentially free.

The user is desirous of obtaining the maximum benefit of the time watching a multimedia presentation device or listening to the sound device.

However, the user cannot control the contents of the radio receiver, except for switching to the best channel fitting the preferences thereof.

In contrast, the user can control the contents of a media player; however, media player contents typically are homogenous; for instance, the media player may contain a lecture of a certain lecturer. In order to have a variety, the user must spend time for preparing contents. In order to eliminate that, and for the benefit of variety, people do prefer listening to the radio, in spite of the unsatisfactory significant portion of the contents thereof.

All the methods described above have not yet provided satisfactory solutions to the problem of insufficient utilization of time by sound and multimedia presentation devices.

It is an object of the present invention to provide an apparatus for playing audio files in a car, which combines functionality that results with increasing driver's safety.

It is another object of the present invention to provide a method and apparatus for fitting a program to user preferences, e.g., tuning out the advertisements.

It is an object of the present invention to provide a solution to the above-mentioned and other problems of the prior art.

Other objects and advantages of the invention will become apparent as the description proceeds.

SUMMARY OF THE INVENTION

In one aspect, the present invention is directed to a personalized car radio system comprising:
 an application server (24) comprising:
  a collector (28), being a software for scanning textual information available over the Internet including web sites, for detecting content corresponding to keywords expressing a driver's preferences, wherein the content being in a form of audio files or text files, and wherein the scanning is carried out continuously or intermittently or on demand;
  a session manager (54), being a software for scheduling displaying collected content in accordance with an alertness rank (60) of the driver and a rhythm of the content; and
 a client device interacting with the application server by Unicast communication, the client device executing a client application (32) comprising:
  a safety module (58), being a software activated continuously or intermittently, for determining an alertness rank (60) according to (a) metered movement of an organ of the driver, and (b) a road condition rank; and
  a sounding device (56) and a user interface thereof, for sounding the scheduled content; and
 a text-to-speech converter, being executed either on the server or the client device, for converting text files to audio files;
 thereby upon detecting a decrease in the driver alertness, displaying to the driver content with higher rhythm.

A monotonous level of driving can be a rank metered by deviations from a line, as metered during a time period. For example, (a) metering the car's geographical position in intervals of 0.25 seconds ("dots"), (b) obtaining parameters of the best line that passes through these dots; (c) the rank is the deviation of the dots from the line.

When metering the monotony with a gyro sensor, the horizontal angle of the vehicle can be metered. Thus, the driving monotony rank can be the average angle deviation during a time period.

Preferably, the server is executed on a cloud, which means performing involved information processing on the cloud rather than on the client device, thereby reducing CPU load on the client device. An additional advantage is reducing communication overhead as only the required data is sent to the client device.

Upon starting sending content from the server to the client, or upon changing a schedule of content in order to increase alertness of the driver, using a higher bandwidth for a predefined period.

Preferably, the client device is executed on a smart phone, being a mobile device that includes software execution capability, wireless communication capability, a GPS client, a device for sounding audio content through a speaker or connection to a speaker, and a gyro sensor.

Preferably, data sent from the server to the client is buffered, thereby overcoming problems selected from the group including: delays, jitters, reception problems.

According to one embodiment of the invention, the user interface of the sounding device 56 is implemented as a physical control panel (rather than a virtual control panel) communicating with the client device by short range communication (such as Bluetooth), for passing content to be displayed from said client device to the physical control panel.

The physical control panel may include a volume knob, a genre selection knob, a switch for selecting music or textual content, a dial knob for selecting an Internet radio station, and the like.

The driver's preferences may include a genre, a performer, and a rhythm, and so on.

According to one embodiment of the invention, the rhythm of an audio file is determined by mathematical wave analysis (such as Fourier transform).

Preferably, content detected by the collector (28) is cached in memory storage media, for being used by other drivers.

Preferably, the user interface employs speech-to-text module, for converting verbal instructions provided by the driver to the client device.

The system may further comprise a list of web sites and parsing logic for each of the web sites.

Preferably, collected content is ranked according to criterions of driver preferences such as audio file genre, audio file rhythm, audio file performer, song name, audio file keywords, article keywords, and so on.

Preferably, upon detecting that the alertness is under a predefined level, the system takes an action for increasing the driver's alertness. Such action may be increasing the volume of the sounding device 56, changing the pitch of sounded content, changing the schedule of content to include audio files having higher rhythm that the current displayed audio file, adding interactive steps for activating content to be displayed, asking the driver to react, displaying an alert sound, blinking a light, displaying a commercial.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Embodiments and features of the present invention are described herein in conjunction with the following drawings.

It should be understood that the drawings are not necessarily drawn to scale.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

Figure 1:
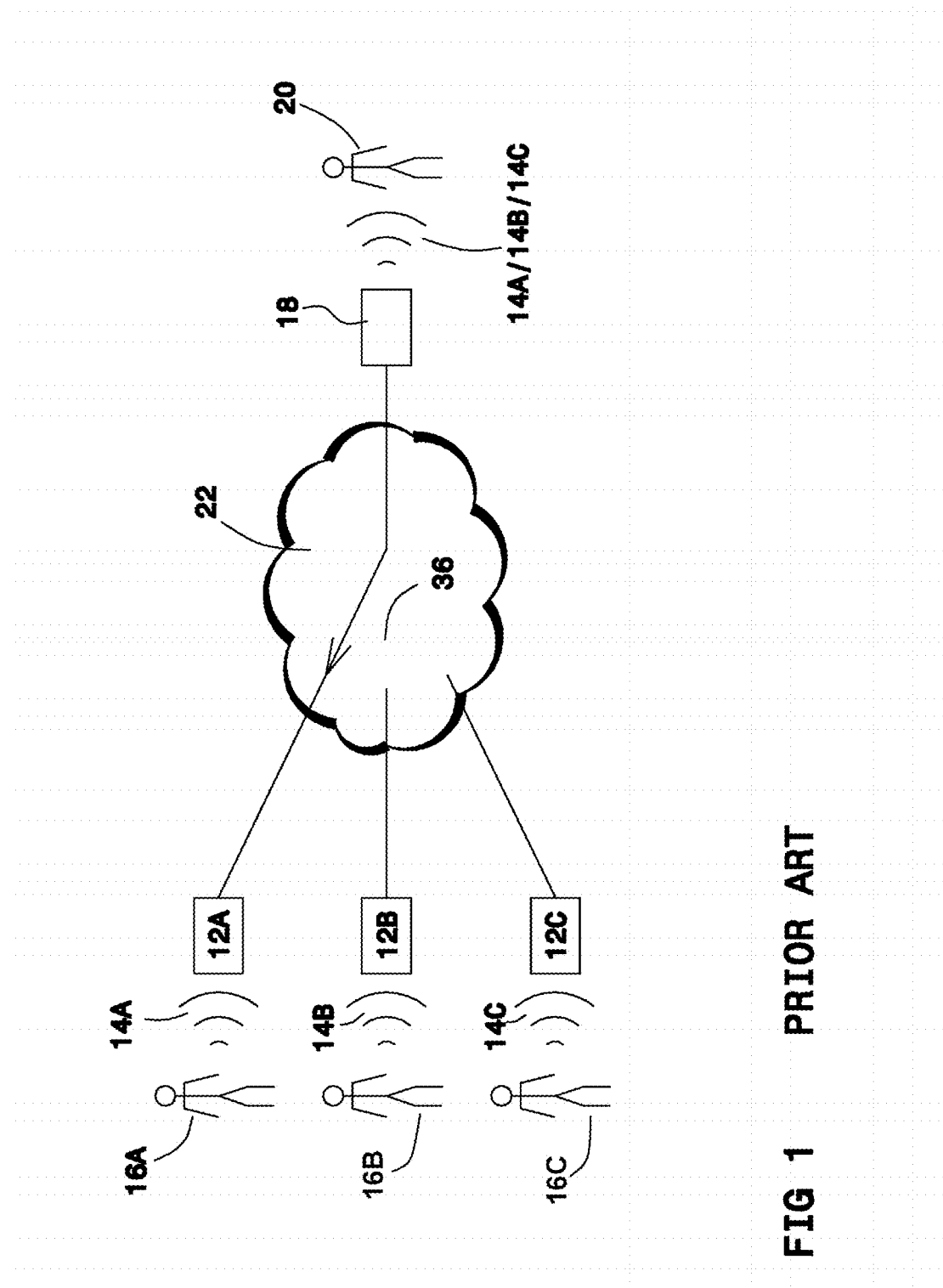
FIG. 1 depicts the conventional broadcasting system.

FIG. 1 depicts the conventional broadcasting system.

The existing broadcasting system includes a plurality of broadcasting stations 12A, 12B, 12C, etc. altogether broadcasting to the open environment 22. Vocal or video contents 14A provided by broadcasting station 12A is prepared by an individual or team 16A; vocal or video contents 14B provided by broadcasting station 12B is prepared by an individual or team 16B; and vocal or video contents 14C provided by broadcasting station 12C is prepared by an individual or team 16C.

A user 20 manually selects either to listen to contents 14A or to 14B or to 14C, by using a switch 36 of a radio receiver 18 either to broadcasting station 12A, or to 12B, or to 12C respectively, one at a time.

Figure 2:
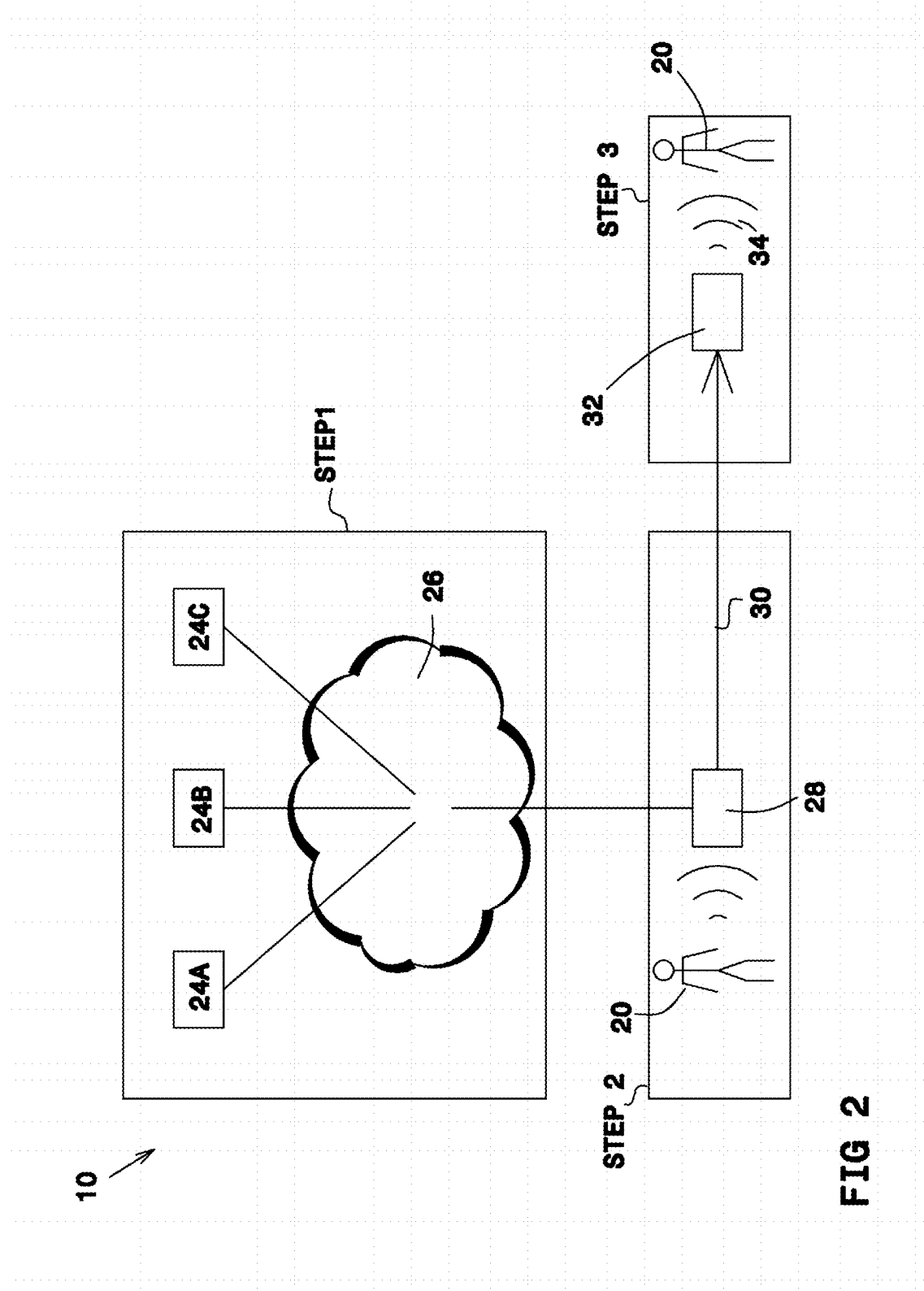
FIG. 2 depicts an information presentation system and steps applied therefor, according to one embodiment of the present invention.

FIG. 2 depicts an information presentation system and steps applied therefor, according to one embodiment of the present invention.

An information presentation system 10 according to one embodiment of the present invention, allows user 20 by himself, or another person, to prepare contents 34 for listening.

At the first step, textual and/or vocal and/or video contents are prepared by a plurality of information sources 24A, 24B, 24C, etc. This first step is not performed by system 10, but rather describes the open environment. Typically, information sources 24A, 24B, 24C constitute servers providing information via the internet 26. However, information source 24A may constitute, for instance, a personal computer of user 20.

Considering the typical case, information sources 24A, 24B, 24C are herein named "servers".

At the second step, user 20 or another person uses a preparation-application 28 for collecting data from servers 24A, 24B, 24C and prepares contents 30 for listening or watching, based on personal preferences of user 20. At the third step, a presentation application 32 presents contents 30 to user 20, as vocal or video contents 34.

Both the collection of the data from servers 24A, 24B, 24C, and the presentation by presentation application 32 may be ruled by the location of user 20 or by a location selected by the user. For example, advertisements may be selected as a function of the business houses being at the location of the vehicle of the user, carrying presentation application 32, or at the location that the user intends to be.

In contrast to the prior art broadcasting system, in which user 20 selects/switches either to listen or watch contents 14A or to 14B or to 14C prepared by external persons 16A or 16B or 16C, one at a time, vocal or video contents 34 of the present invention prepared by user 20 may be unique. For example, vocal or video contents 34 may mix music from server 24A together with a speech from server 24B, for being heard/watched simultaneously.

System 10 has the advantage of allowing user 20 to prepare the contents according to personal preferences. Another advantage of system 10 is of converting textual contents from servers 24A, 24B and 24C to vocal or video contents 34, in circumstances in which listening is possible and viewing is not, for instance, while driving a vehicle.

At the second step, preparation-application 28 collects data from servers 24A, 24B, 24C for preparing contents 30, based on personal preferences of user 20.

System 10 provides a simulation to a radio channel. System 10 may display news, weather, or any other selected retrieved information. However, this "radio channel" is advantaged over any real radio channel of broadcasting station 12A, 12B or 12C in being personal, as system 10 allows user 20 to apply personal preferences thereof.

A simple example of a personal preference of user 20 is reading incoming email thereof. For applying this preference, preparation-application 28 retrieves, say, from server 243B, the unread emails, being contents 30, of the personal account of user 20, details of which are provided to preparation-application 28; and presentation application 32 converts the texts of the retrieved email to vocal contents, these being vocal contents 34.

Figure 3:
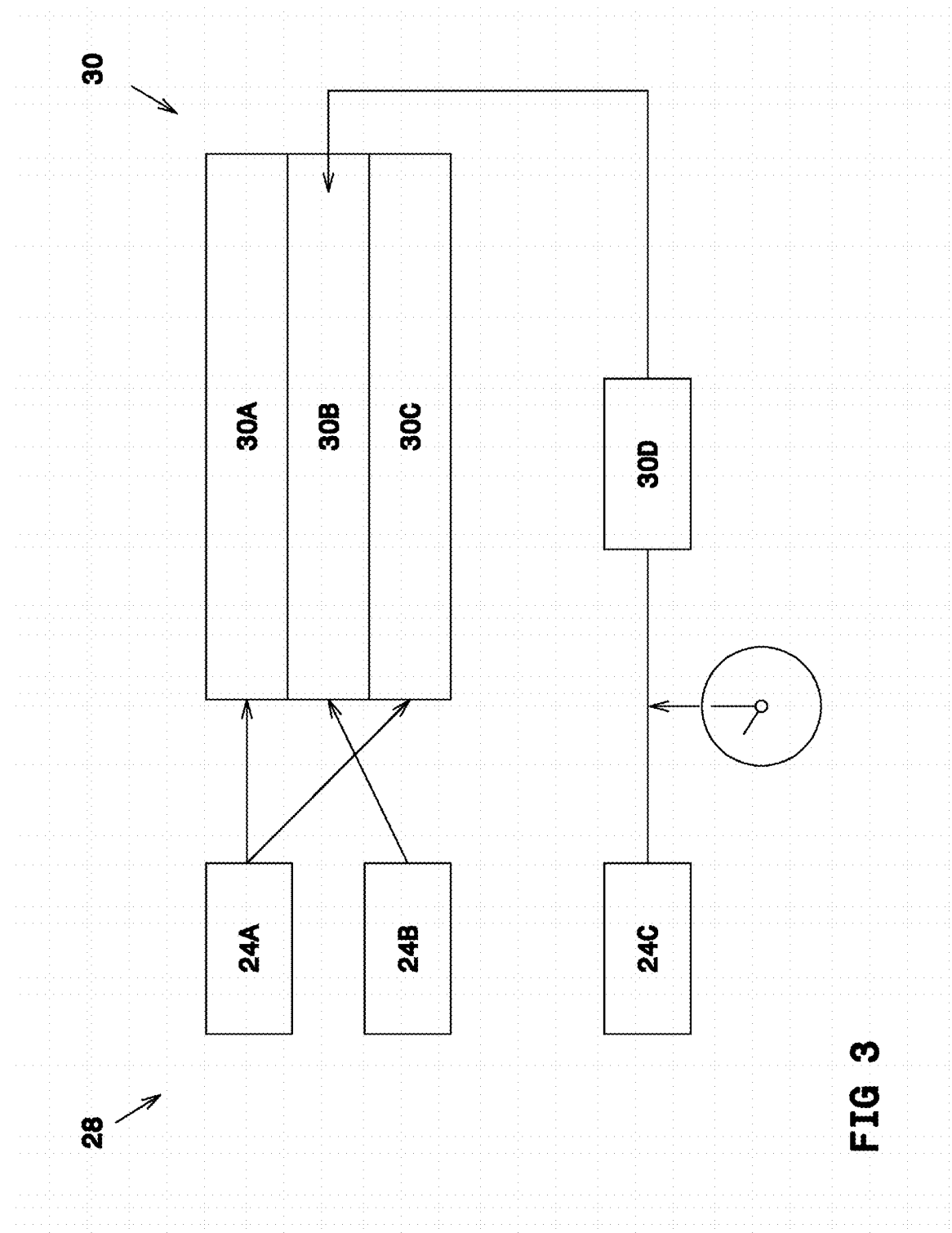
FIG. 3 is a block diagram of an example of preparation of the contents, at the second step of FIG. 2.

FIG. 3 is a block diagram of an example of preparation of the contents, at the second step of FIG. 2.

Contents 30 typically constitutes a combination of a plurality sub-contents 30A, 30B, 30C, etc. According to the example in FIG. 2, sub-contents 30B may constitute the emails retrieved from server 24B.

According to the example of FIG. 3, the user has selected at the second step of FIG. 2, by preparation-application 28, sub-contents 30A from server 24A to be listened/watched first, sub-contents 30B from server 24B to be listened/watched second, and sub-contents 30C from server 24A to be to listened/watched third.

It may be understood that sub-contents 30C may be a continuation of sub-contents 30A, for explaining that certain sub-contents may be interrupted by other sub-contents.

FIG. 3 further shows that sub-contents 30D from server 24C may interrupt sub-contents 30C, as a function of a clock 38, for example at 10 o'clock or once an hour, for announcing the news or presenting advertisements.

Thus, contents 30 constitute a schedule being prepared by user 20 or another person. The schedule may also consider, except for the order between the selected sub-contents 30A, 30B and 30C, additional considerations, such as timing.

Contents 30, like conventional radio broadcasting, may include sub-contents of advertisements. The advertisements may pop up as interruptions to other sub-contents. However, user 20 by the preparation thereof controls the rules of the advertisements, e.g., one advertisement per 20 minutes. Financial rules between user 20 and any of servers 24A, 24B or 24C providing the advertisements, may be established accordingly.

Figure 4:
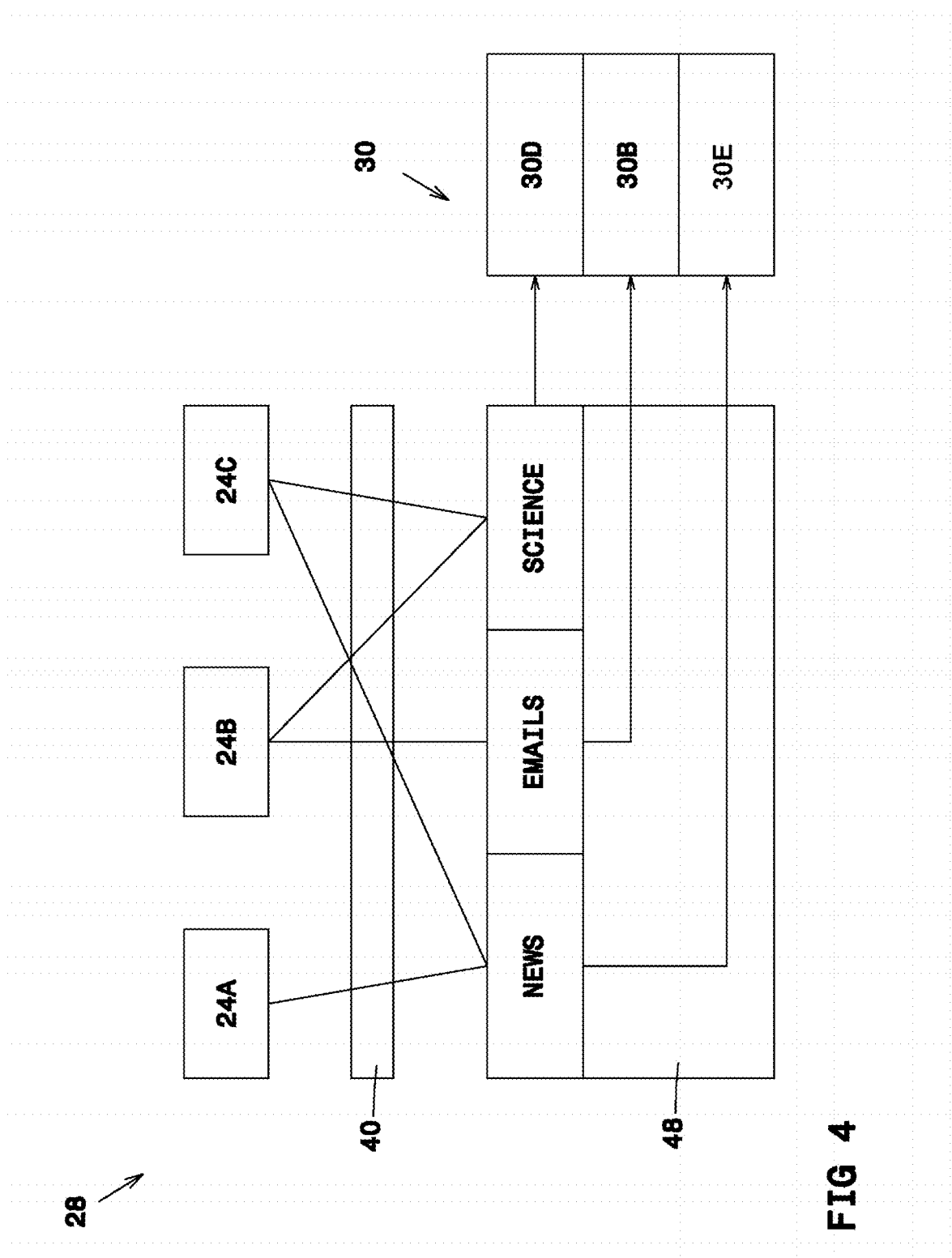
FIG. 4 describes further functions of the preparation-application of FIG. 2.

FIG. 4 describes further functions of the preparation-application of FIG. 2.

According to a preferred embodiment, user 20 need not explicitly select sub-contents 30A, or 30B or 30C, but rather indicate preferences and rules for the selections, according to which application 28 searches for the best fitting sub-contents addressing these rules.

According to the example of FIG. 4, the user preferences are to listen to news, emails and science information. Application 28 using a data miner 40 and/or a search engine and/or rules determined by user 20 finds news in servers 24A and 24, finds emails in server 24B, and finds information of science in servers 24B and 24C, and stores them in a database 48. Various additional configurations may be applied regarding where the information is stored and processed.

The further preferences of user 20 according to the example of FIG. 4 are to listen first to science, then to email, then to news, and then to science again. Thus application 28 inserts contents 30D of science from servers 24B and 24C first, contents 30B of emails from server 24B second, and contents 30E of news from servers 24A and 24C third.

According to one embodiment, the user may gather each type of contents to a separate library or file, for allowing the user select the type contents to be presented upon demand, by pushing a different displaying button. The user can switch from one channel to another either by a voice command button or by a software menu.

By this organization of gathering and splitting, the product may simulate, or in other words seem to the user as providing several "radio channels". However here the radio channels are of areas of interest. For example one channel may be news, the other sports, music, stocks etc.

Figure 5:
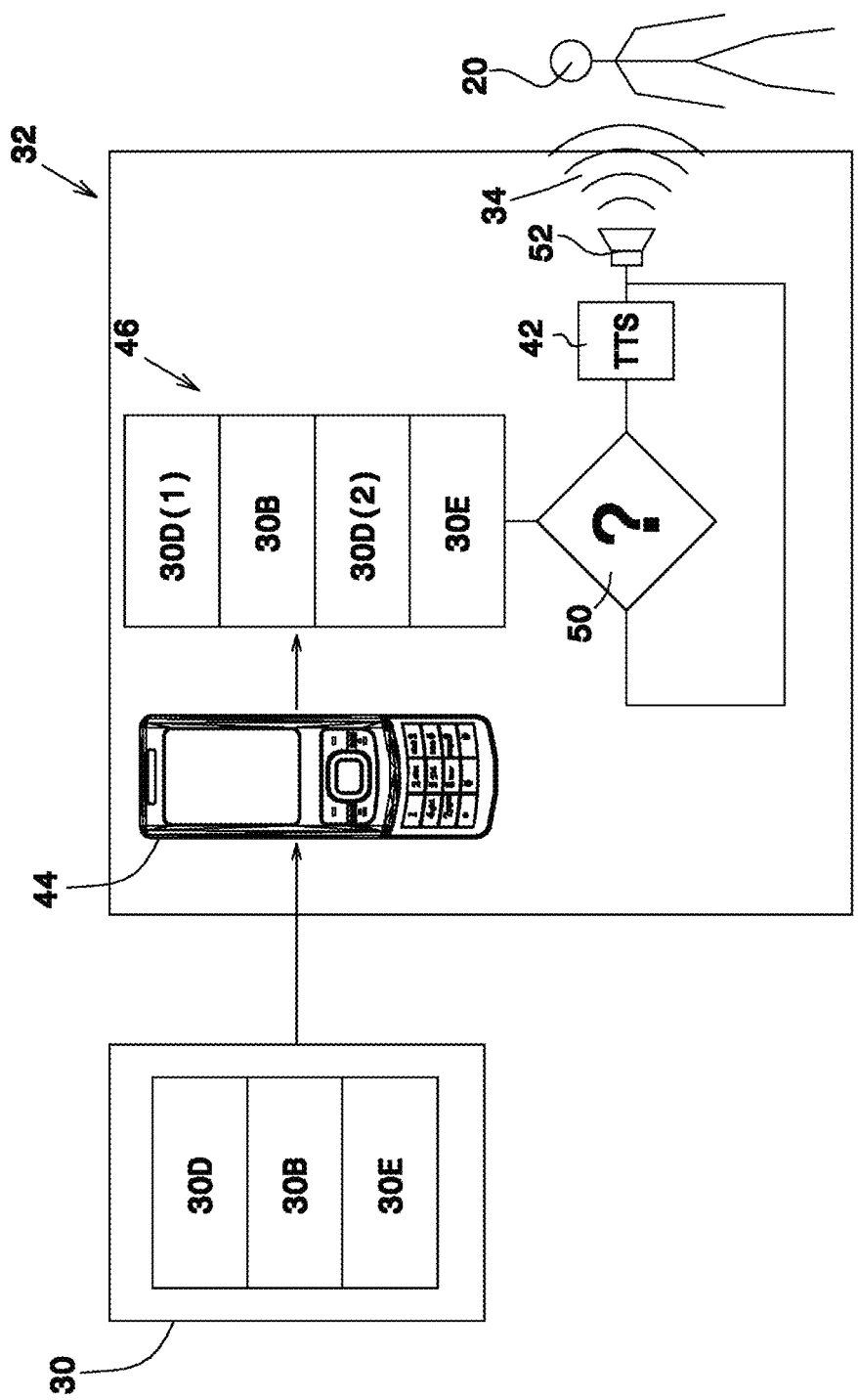
FIG. 5 is a block diagram of the presentation application of FIG. 2

FIG. 5 is a block diagram of the presentation application of FIG. 2.

According to the example of FIG. 4, presentation application 32 receives contents 30, including the sub-contents of 30D, 30B and 30E. User 20 may make changes during listening/watching, for providing a changed schedule 46 of contents, by using a user interface 44. FIG. 5 shows, as an example, that contents 30 includes ordered sub-contents from 30D, 30B, 30E and is changed to changed schedule contents 46 including: start of 30D, then 30B, then end of 30D, and 30E at the end. According to another example, the user may request additional information regarding a presented subject.

A directing element 50 directs changed schedule contents 46 or contents 30 if not changed for listening thereof to user 20. Directing element 50 directs the sound portions of contents 30, for example a music file, directly to a loudspeaker 52, for producing sound 34, heard by user 20. Directing element 50 directs the textual portions of contents 30 to a text to speech (TTS) converter 42, for conversion thereof to speech information; loudspeaker 52 produces sound contents 34 from the speech information.

According to one embodiment, a mobile phone of user 20 provides the sound of contents 34.

According to one embodiment, in addition and similar to vocal contents described above, user 20 may also select video contents for presentation by a displaying application which may also be enumerated 32, since it is similar to presentation application 32 except of having visual features, such a screen in addition to loudspeaker 52.

Thus, system 10 having displaying-application 32, for producing to user 20 video of video portions of scheduled contents 30, may simulate a television channel. This simulated television channel is advantaged over a prior television channel in providing personal preferences applied by preparation of the schedule by user 20.

Various additional configurations may be applied regarding where the information is stored and processed. For instance, preparation-application 28, presentation application 32, displaying application 32, database 48, text to speech (TTS) converter 42 or other components of system 10 may be located in a server in the internet, or in the mobile phone of the user, or in another location therebetween.

A Personalized Car Radio System (PCR)

Figure 6:
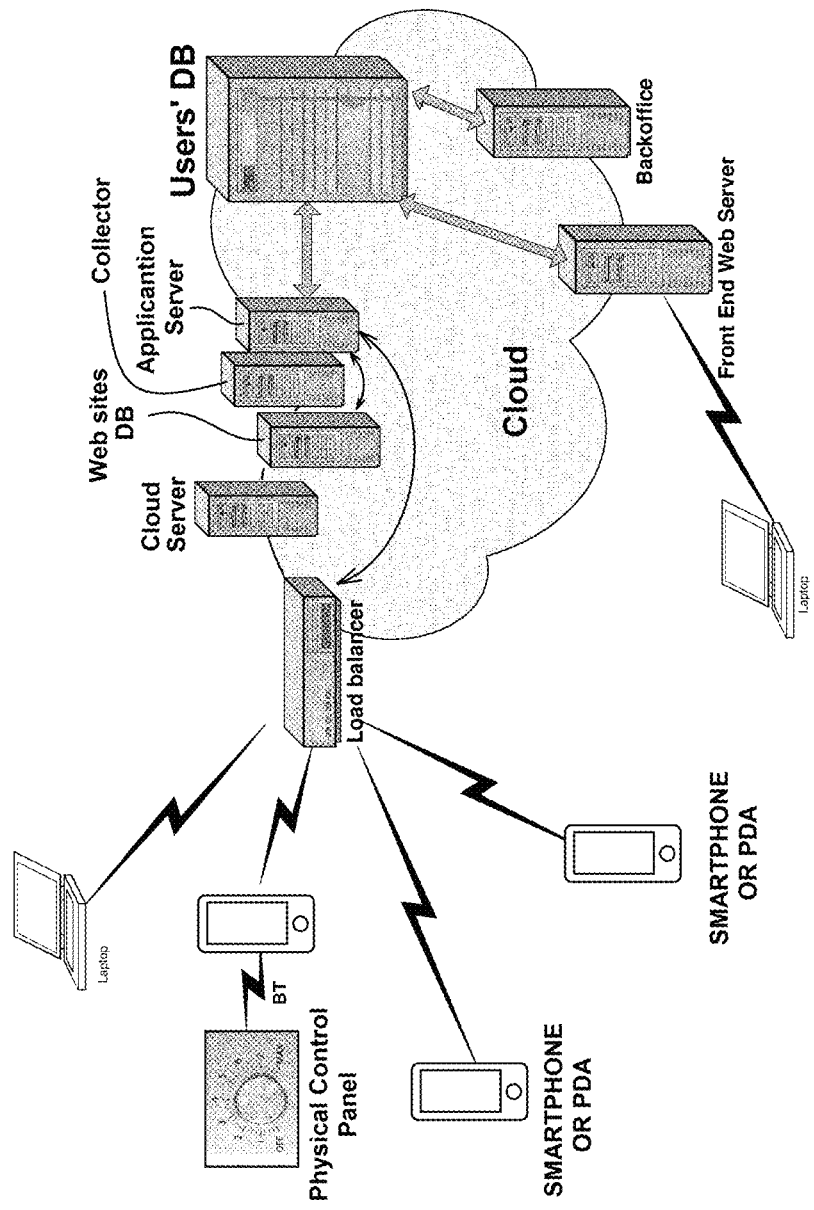
FIG. 6 schematically illustrates client cloud architecture of a PCR system, according to one embodiment of the invention.
Figure 7:
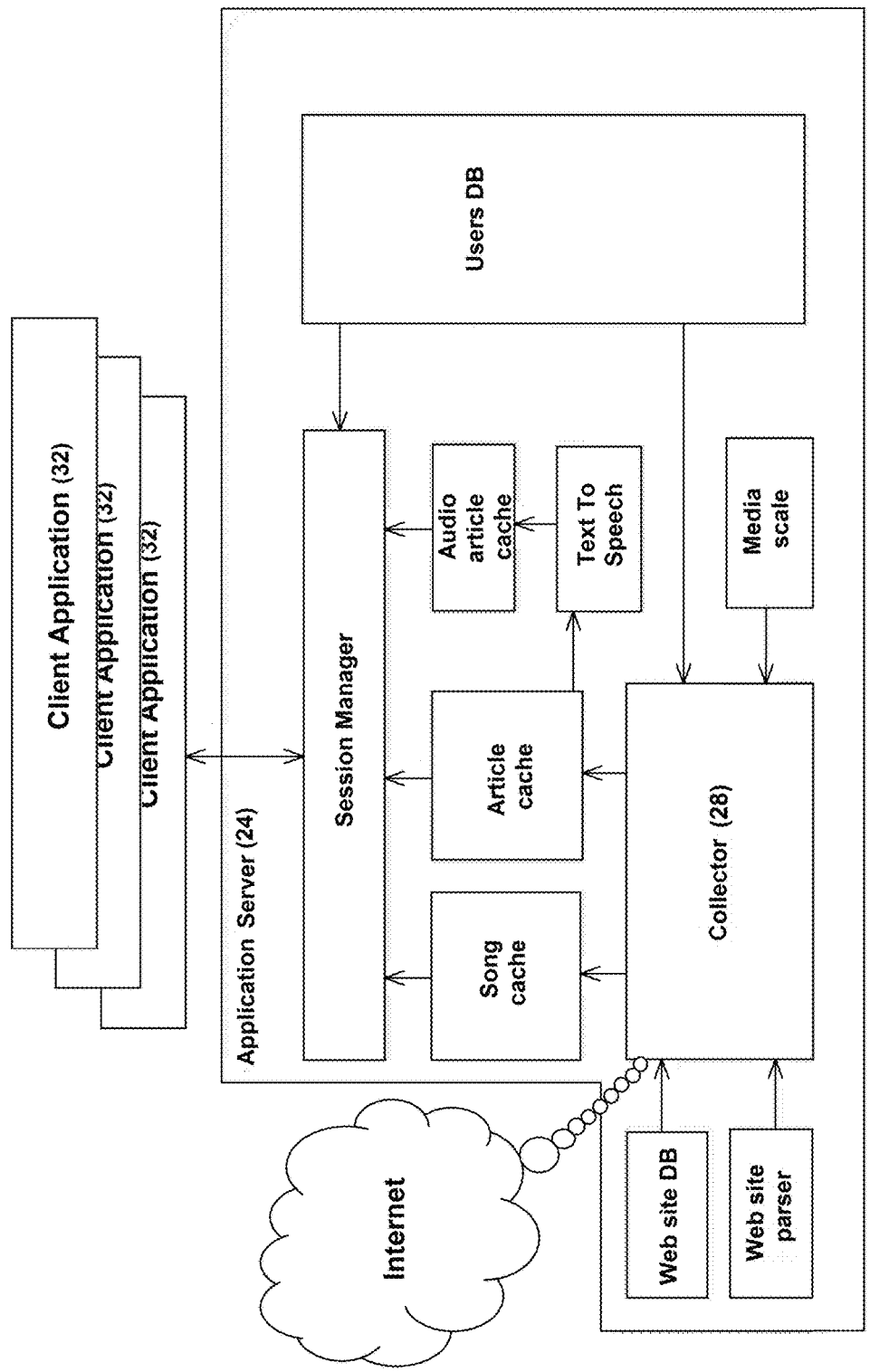
FIG. 7 is a block diagram of an application server, according to one embodiment of the invention.

According to one embodiment of the invention illustrated in FIGS. 6 and 7, the present invention is directed to a Personalized Car Radio system (PCR). This term refers herein to a multi-media car radio system that displays audio content to the car driver. The content is selected according to the driver's preferences, which can be retrieved from the Internet, or from content stored on storage media. Such content may be radio programs including songs and articles of interest by the driver. A substantial feature of the PCR is its ability to enhance driver alertness and safety.

FIG. 6 schematically illustrates client cloud architecture of a PCR system, according to one embodiment of the invention.

Cloud computing is a kind of Internet-based computing that provides shared processing resources and data to computers and other devices on demand. (From Wikipedia)

The end-users are running a client application on their PDA/smart phone, which interacts with the cloud servers.

The client application creates a dedicated session with the server and authenticates the user. The application server then queries the users' database to obtain the user information (configured key words and additional criteria defined by the user). The application server generates the use's Personal Radio Unicast (PRU), based on the configured user preferences and sends a stream of songs (MP3 file) and articles (text or MP3 files) to the client application.

The user can control the Personal Radio Unicast, using either a Physical Control Panel (PCP) connected via Bluetooth to the smart phone, the smart phone GUI or verbal commands. The user input is transmitted to the server, causing it to adjust the PRU accordingly.

A GUI front-end web site is used to create user accounts in the database and to define user profiles, PRU criteria and accounting information. A back office backend is used to connect the system to the back office applications.

The application server can run remotely in the cloud or locally on the same device as the client application which runs on a client platform such as a smart phone, laptop, and so on. The client platform may be a mobile device, as well as a stationary device such as a desktop computer.

Collecting Personalized Content

FIG. 7 is a block diagram of an application server, according to one embodiment of the invention.

When a user account is created, a list of pre-defined subjects or key-words is generated, describing the user's fields of interest, favorite music, etc. This information is stored in the users DB (database).

A web sites DB contains a list of relevant web sites with their parsing logic. The collector 28 (which is an application program executed on the application server, on a separate server, and so on) continuously scans the list of web sites and parses them looking for new articles that contain one of the key-words in the key-word database (priority is given to key-works of active users). Scans are initiated periodically or upon user logon.

When such an article is found, the article is stored in the articles text cache. The text-to-speech module converts the text articles to MP3 files that are stored in the articles audio cache.

In addition, the collector 28 continuously (intermittently or on demand) scans the database and/or the Internet for relevant songs, though in lower priority. Located songs are stored as MP3 files in the songs cache.

By using background scanning and caching, the PCR system can pre-fetch the relevant data. Using the cache to generate the PRU significantly shortens the creation process. Moreover, in a multi-user system, some articles/songs may be used by more than one user, thus using a cache can reduce the load on the application servers.

Media Scale

The collector ranks each collected song on a pre-defined "media scale". A media scale is one or more numeral ranks provided to a sound file ("song"). A rank can be calculated based on metrics provided by the user such as the music genre (i.e. pop, classic, etc.). Especially, the collector takes in consideration the rhythm of the songs. The rhythm of a song can be calculated by mathematical analysis such as Fourier transform on a sound file ("song").

Building the Personal Radio Unicast

In computer networking, Unicast transmission is sending of data to a single network destination identified by a unique address.

When the user connects to the PCR server, a dedicated session is generated. Following the user authentication, the relevant key-words are retrieved from the users' database.

The session manager 54, which is a software module executed on the application server, generates the Personal Radio Unicast that includes articles, songs, commercials etc., which have been detected by the scanning of the collector. The session manager 54 builds the unicast for the next hour and updates it every 30 minutes or upon user request.

The PRU list is converted to a sequence of MP3 files. The session manager 54 "plays" the list by looking up the articles and songs in the relevant databases on all the application servers and generating an audio session (or text session) that is transmitted to the client platform executing a client application. The session is buffered on the client side to account for problems such as delays, jitters, reception problems etc.

In case the remote client comprises text-to-speech capabilities, on the client platform, the session manager 54 sends the articles in text format instead of audio, thus saving bandwidth.

Figure 8:
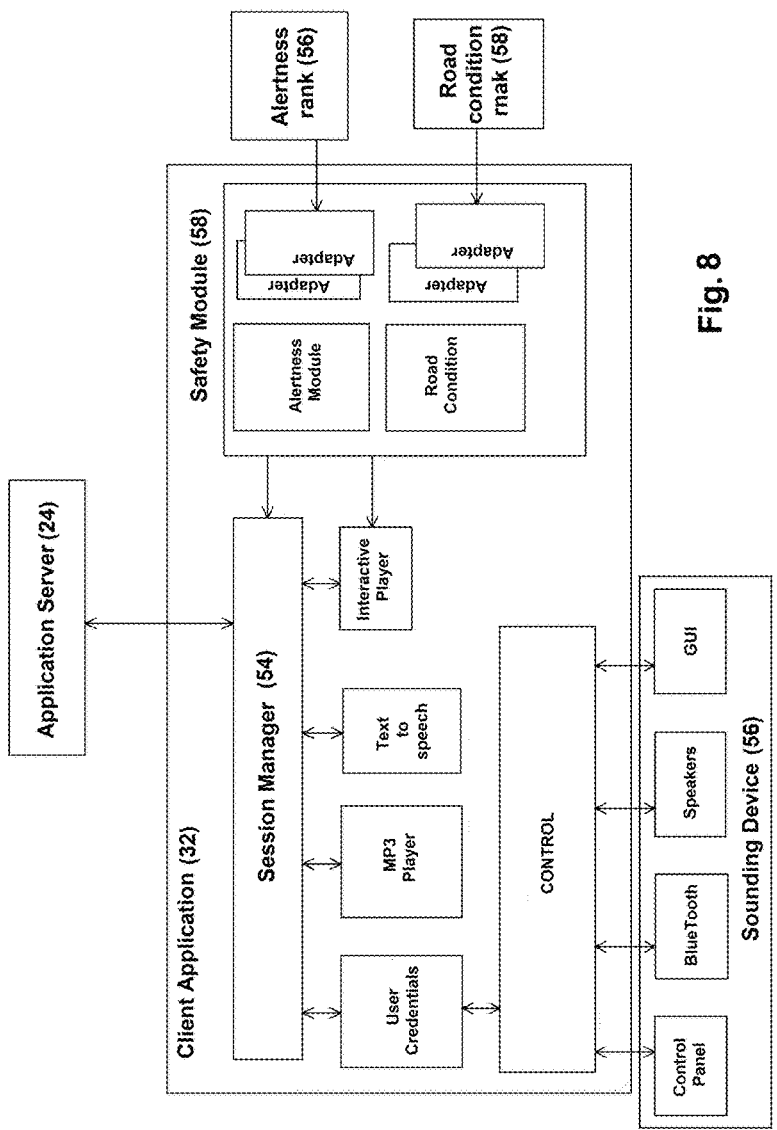
FIG. 8 is a block diagram of a client application, according to one embodiment of the invention.

FIG. 8 is a block diagram o a client application, according to one embodiment of the invention.

Turning on the PCR Client Device

When turned on, the client application executed on the client device prompts the user for his credentials or retrieves them from the flash memory. The application establishes a connection with the application server and authenticates the user.

Driving Safety Evaluation Module

The PCR makes use of a safety module 58 which is responsible for collecting information from external applications and evaluate the driver's (i.e., user's) alertness. For example, it may make use of an application program/hardware that reads eye movements to evaluate alertness. Such metrics is used as an input for the music selection module. When a driver is indicated as "sleepy", the PRU list is changed such that the next songs have increased vivid rhythm.

In addition to collecting and translating driver alertness metrics, PCR evaluates the road condition rank 62 to determine the required level of stimulation to be provided by the application. For example, a "high" level stimulation is necessary when the road conditions require minimal interaction on the driver's side, which in turn may cause the driver alertness to drop. According to another example, a monotonic driving of for example 30 minutes can cause the PCR to react by displaying songs which have increased vivid rhythm, annoying commercials, an alert sound, and so on.

The road conditions and driver interaction are evaluated by reading inputs from the car system (e.g. wheel movements, using breaks, manipulating light etc.) that provide information about the road conditions (e.g. amount of traffic, complexity of driving). Information regarding the road characteristics (e.g. number of turns, traffic, etc.) is also provided by a navigation application (e.g. Waze). Additionally or alternatively, the road condition is detected by a gyro sensor.

The safety module 58 is responsible for processing all inputs and providing a scale (e.g. from 1 to 10) conveying the required level of stimulation to the session manager 54 module.

Figure 9:
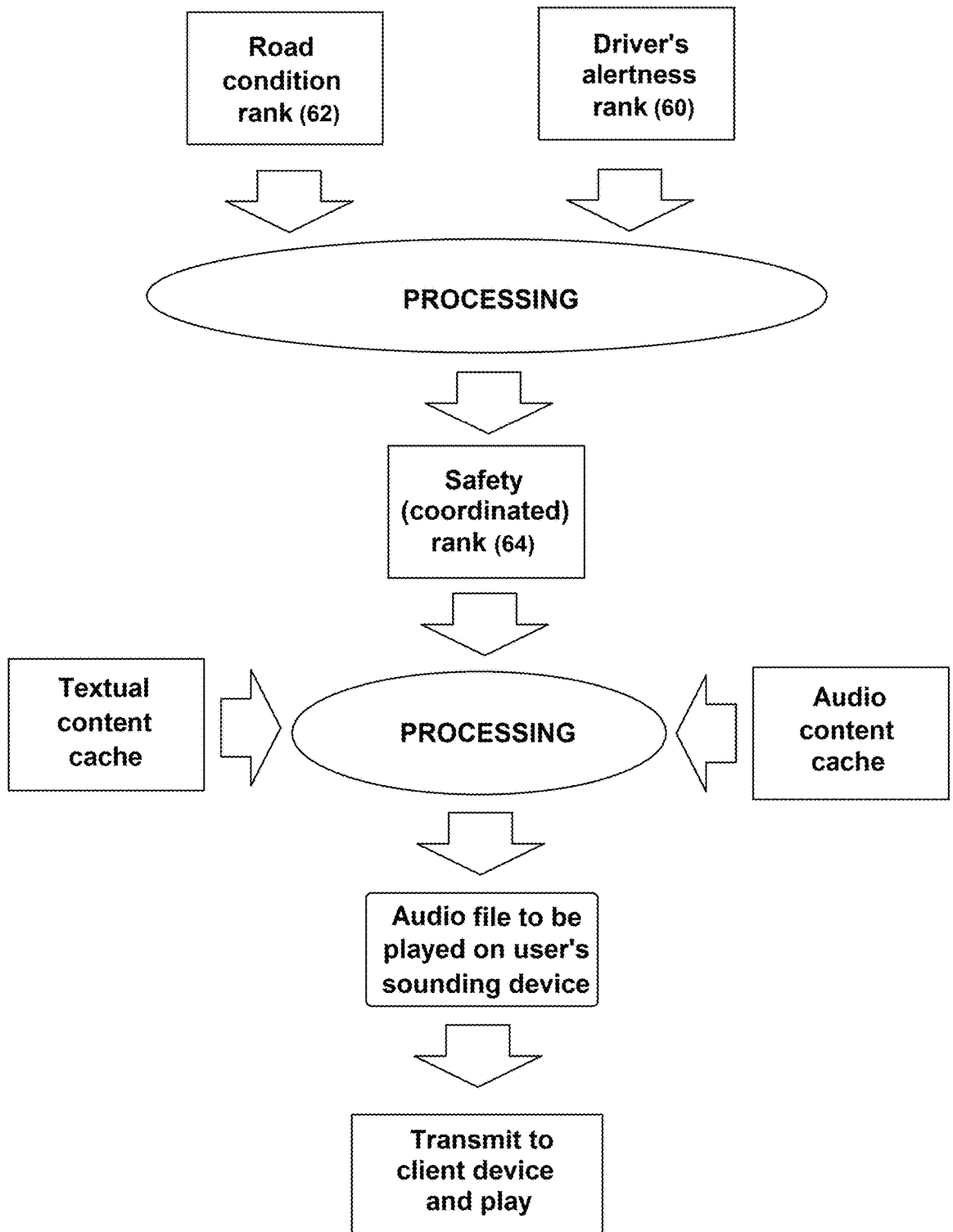
FIG. 9 is a block diagram schematically illustrating a process of generating audio files (such as MP3), in accordance with safety-related parameters.

FIG. 9 is a block diagram schematically illustrating a process of generating audio files (such as MP3), in accordance with safety-related parameters.

Two factors are taken in considerations: the road condition and the driver's alertness. The road condition may be, for example, traffic load, weather (such as a wet road), monotonic driving (such as an empty road) which may put the driver into sleep, and so on. Some of such information may be obtained from the application server, and some (such as a monotonous driving) may be obtained from the client's device.

As per the driver's alertness, it may be obtained by observing the driver, such as the rate of eye blinking and actually any organ including the hands movement, which may be measured by the car's wheel rotation.

Assuming each of the factors road condition and driver's alertness are expressed as a rank for 0 to 100, then a weighted average calculated by processing software may generate an additional rank, "safety rank" 64, which expresses the safety of the driving.

Having a safety rank 64, the PRU list may be amended according to the safety rank. For example, if the safety rank indicates a sleepy situation of the driver, the PRU list may be amended to include music of higher rhythm, in accordance to "media scale" such as genre. If the driver is not influenced by the increased rhythm music, the PRU sounding device 56 may turn to interactive mode, which may, for example, include playing questions to the driver, and waiting for his replay. Such questions may be, for example, "The following content is to be played. Which one you want to be played now?" The user may respond by reading the option out loud.

Playing the PRU

Once the user is authenticated, the PRU stream is received by the client. The PRU stream contains MP3 segments displayed by the client's MP3 engine. Clients that have text-to-speech (TTS) capabilities can receive text segments thereby saving bandwidth (BW). In this case, the received text segments are converted to speech before being displayed. The session manager 54 on the application server may transmit a text article before the songs segments, to allow the text-to-speech conversion to take place in parallel to displaying the songs.

The entire session is buffered. The first few minutes of transmission use high bandwidth to allow buffering in parallel to playback. Buffering allows the client to handle jitters as well as reception problems.

The session manager 54 uses inputs from the safety module 58 to determine which songs (according to their ranking on the anti-dose scale) should be filtered. When the safety module indicates higher ranked music is required, the session manager uses only songs that rank high on the anti-dose scale, thus improving the driver alertness safety.

Interactive Article Player

The session manager 54 can choose to display an article (using text-to-speech) either directly or using the interactive article player. This is determined according to indication from the safety module 58. Displaying the article in an interactive mode helps to improve the driver alertness and safety.

The interactive article player divides the article into paragraphs. The player pauses after each paragraph and inquires whether the driver is interested continuing to the next paragraph (verbal approval). If the driver does not approve, the module increases the volume and eventually displays a high pitch sound.

Controlling the PRU

The PRU control commands allow the user to perform actions, such as ask for an additional article on the same subject as the one that was just displayed, skip songs or articles, switch to another song category etc. The commands are sent to the application server that in turn alters the PRU accordingly. The changes take effect after the next song is displayed and the BW is doubled again for a few minutes to re-buffer the new PRU.

The PRU client provides several control options including GUI, verbal commands, and physical control panel. When verbal commands are used, the PRU client may use the Google speech-to-text utility and the like to convert the verbal commands on line.

The physical control panel is an external optional gadget. The control panel allows the user to control the PRU, using physical knobs similar to a regular radio. The control panel connects to the application, using Bluetooth protocol and the like to send commands to the smart phone.

In the figures and/or description herein, the following reference numerals have been mentioned:
  numeral 10 denotes an information presentation system, according to one embodiment of the present invention;
  numerals 12A, 12B and 12C denote broadcasting stations;
  numeral 14A denotes vocal or video contents provided by broadcasting station 12A;
  numeral 14B denotes vocal or video contents provided by broadcasting station 12B;
  numeral 14C denotes vocal or video contents provided by broadcasting station 12C;
  numerals 16A, 16B and 16C denote persons or teams preparing contents to be broadcasted;
  numeral 18 denotes a radio receiver;
  numeral 20 denotes a user preparing a schedule of contents; numeral 20 also denotes a user hearing the schedule of contents; the person preparing applies personal preferences of the person listening or watching, and they may be the same person;
  numeral 22 denotes the open space including radio waves;
  numerals 24, 24A, 24B, 24C denote information sources or servers (also referred as application server);
  numeral 26 denotes the internet;
  numeral 28 denotes the preparation application;
  numeral 30 denotes contents selected from the servers;
  numerals 30A, 30B and 30C denote sub-contents or portions of contents 30;
  numeral 32 denotes a presentation application (also referred as client application) being an application receiving the selected contents and displaying it to the user;
  numeral 34 denotes vocal or video contents provided by the presentation application;
  numeral 36 denotes a switch of a radio receiver, for receiving a certain channel;
  numeral 38 denotes a function of time, described by a clock;

numeral 40 denotes a search engine and/or a data miner;
numeral 42 denotes a text to speech convertor, for converting retrieved text to speech being listened to by the user;
numeral 44 denotes a user interface;
numeral 46 denotes contents being changed while being listened to;
numeral 48 denotes a database;
numeral 50 denotes a directing element, for directing only the text to the text to speech converter;
numeral 52 denotes a loudspeaker or an earphone;
numeral 54 denotes a session manager;
numeral 56 denotes a sounding device;
numeral 58 denotes a safety module;
numeral 60 denotes an alertness rank; and
numeral 62 denotes a road condition rank.

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

The invention claimed is:

1. A personalized car radio system comprising:
an application server comprising:
a collector, being a software for scanning textual information available over the Internet including web sites, for detecting content corresponding to keywords expressing a driver's preferences, wherein said content being in a form of audio files or text files, and wherein said scanning is carried out continuously or intermittently or on demand;
a session manager, being a software for scheduling displaying collected content in accordance with an alertness rank of said driver and a rhythm of said content;
a client device interacting with said application server by Unicast communication, said client device executing a client application comprising:
a safety module, being a software activated continuously or intermittently, for determining an alertness rank according to metered movement of an organ of said driver under a road condition rank,
wherein said metered movement is measured by at least one member of a group consisting of: eye blinking, hand movement of the car steering wheel,
and wherein said road condition rank is provided by at least one member of a group consisting of: a GPS navigation system, a gyro sensor;
a sounding device and a user interface thereof, for sounding the scheduled collected content; and
a text-to-speech converter, being executed either on said server or said client device, for converting text files to audio files,
thereby upon detecting a decrease in said driver alertness, displaying said content having a higher rhythm to said driver.

2. A system according to claim 1, wherein said server is executed on a cloud, thereby performing involved information processing on the cloud rather than on the client device, resulting in reducing CPU load on the client device and reducing communication overhead as only the required data is sent to the client device.

3. A system according to claim 1, wherein upon starting sending content from said server to said client, or upon changing a schedule of content in order to increase alertness of said driver, using a higher bandwidth for a predefined period.

4. A system according to claim 1, wherein said client is executed on a smart phone, being a mobile device that includes software execution capability, wireless communication capability, a GPS client, a device for sounding audio content through a speaker or connection to a speaker, and a gyro sensor.

5. A system according to claim 1, wherein data sent from said server to said client is buffered, thereby overcoming problems selected from the group including: delays, jitters, reception problems.

6. A system according to claim 1, wherein said user interface of said sounding device is implemented as a physical control panel communicating with the client device by short range communication for passing content to be displayed from said client device to said physical control panel.

7. A system according to claim 6, wherein said physical control panel comprises a member selected from the group including: a volume knob, a genre selection knob, a switch for selecting music or textual content, a dial knob for selecting an Internet radio station.

8. A system according to claim 1, wherein said driver's preferences are selected from the group including: a genre, a performer, and a rhythm.

9. A system according to claim 1, wherein a rhythm of an audio file is determined by mathematical wave analysis.

10. A system according to claim 1, wherein content detected by said collector is cached in memory storage media, for being used by other drivers.

11. A system according to claim 1, wherein said user interface employs a speech-to-text module, for converting verbal instructions provided by said driver to said client device.

12. A system according to claim 1, further comprising a list of web sites and parsing logic for each of said web sites.

13. A system according to claim 1, wherein collected content is ranked according to criterions of driver preferences selected from a group including: audio file genre, audio file rhythm, audio file performer, song name, audio file keywords, article keywords.

14. A system according to claim 1, wherein upon detecting that said alertness is under a predefined level, taking an action selected from the group including: increasing the volume of said sounding device, changing the pitch of sounded content, changing the schedule of content to include audio files having higher rhythm that the current displayed audio file, adding interactive steps for activating content to be displayed, asking said driver to react, displaying an alert sound, blinking a light, displaying a commercial, thereby increasing said driver's alertness.

15. A system according to claim 1, wherein said road condition rank comprises monotony of driving, as metered by a GPS.

16. A system according to claim 1, wherein said road condition rank comprises monotony of driving as metered by a gyro sensor.

17. A system according to claim 1, wherein said road condition rank is provided by an online weather service.

18. A system according to claim 1, wherein said road condition rank is provided by a navigation application.

19. A system according to claim 1, wherein said road condition rank comprises car's velocity and acceleration as metered by a smart phone.

20. A system according to claim 1, wherein said road condition rank comprises the car's velocity and acceleration as metered by car's systems.

* * * * *